May 17, 1966 M. J. GREEN ETAL 3,251,230
WHEEL WEIGHT
Filed Aug. 30, 1963

INVENTORS
BERNARD J. GREEN,
MILTON J. GREEN &
JEROME J. CHOROSEVIC

BY
Mason, Fenwick & Lawrence
ATTORNEYS

United States Patent Office 3,251,230
Patented May 17, 1966

3,251,230
WHEEL WEIGHT
Milton J. Green, 901 Anderson St., and Bernard J. Green, 901 Broad St., both of Bristol, Tenn., and Jerome J. Chorosevic, 404 Seminole Road, Bristol, Va.
Filed Aug. 30, 1963, Ser. No. 305,709
7 Claims. (Cl. 73—487)

This invention relates generally to a weight designed for use in balancing. More particularly, the weight of the present invention is designed for use in balancing vehicle wheels to determine the amount of weight and the location of the unbalance when the wheel is positioned on a horizontal balancer.

Various methods have been suggested in the past for balancing vehicle wheels; however, in most such methods, which may be typified by a recent patent utilizing pairs of the actual wheel weights in determining the amount and location of the unbalance, the wheel weights used in the balancing procedure are ultimately placed upon the wheels. The serious drawback in the use of the actual wheel weights to be applied to the wheel in the balancing procedure for determining the unbalance is that these weights often are not movable about the light spot on the wheel, in accordance with one of the steps of the commonly used procedures. Such weights have been found not to be easily movable, principally due to their shape and design, primarily directed to forming a tight, secure fit between the rim of the wheel and the weight, rather than the least amount of friction, to enable the weights to easily slide about the light spot.

Accordingly, it is an object of the present invention to provide a test weight for use in balancing automotive wheels in which only two weights are aplied to a wheel at one time.

This invention also has as an object the provision of a test weight which is easily slidable on the rim about the light spot.

Another object of the present invention is the provision of a test weight having an enlarged mass with means thereon for determining the center of the mass to aid in the application of the weights at the proper location.

Other objects and advantages of the present invention will become aparent to those skilled in the art from the following description when read in conjunction with the accompanying drawing, wherein.

The prior art method of balancing wheels has been mentioned above; however, it is proposed that two test weights, according to the present invention, are to be used in accordance with the following method for balancing wheels:

(1) Clean wheel thoroughly, especially at the rim and flange, removing all old wheel weights;

(2) Mount wheel and tire assembly on a conventional, horizontal balancing machine;

(3) Determine the position of the light spot in accordance with the particular balancing machine used and mount tire to indicate the light spot;

(4) A pair of weights, according to the present invention, is selected from three pairs of small, medium, and large pairs of weights, the individual weights of each pair being identical in all respects;

(5) Place a pair of the small weights adjacent the light spot. If they overbalance or overcorrect the unbalancing as indicated on the balancing machine, proceed to the next step. If the small weights do not overcorrect the unbalance of the wheel, the medium and large weights, successively, should be used until one pair overcorrects the unbalance. The weights are then moved symmetrically on the rim about the light spot until the wheel is balanced, as shown by the balancing machine.

(6) The pair of test weights thus have accurately balanced the wheel, and it remains only to substitute actual wheel weights for the test weights to complete the balancing procedure.

(7) The tire is marked at both points at which the test weights are finally positioned by the use of the indicia arrowhead located on the body of the test weight. The actual wheel weights are then selected which are half the weight of each of the test weights, and each such actual weight is positioned on the inside and outside rim at the same distance from the light spot. Thus the wheel will have a total of four weights, each weight being one-half the weight of the test weight. Two weights will be on the inside and two weights on the outside rim, thus correcting static balance and not disturbing the dynamic balance.

The numeral 10 designates the test weight according to the present invention and constitutes one of a pair of weights which may be designated small, medium, or large, in accordance with the previously described method.

Figure 1:
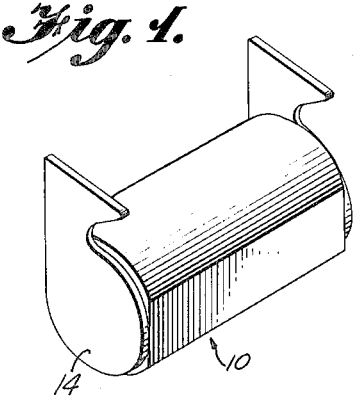
FIGURE 1 is a persepctive view of the test weight according to the present invention.
Figure 2:
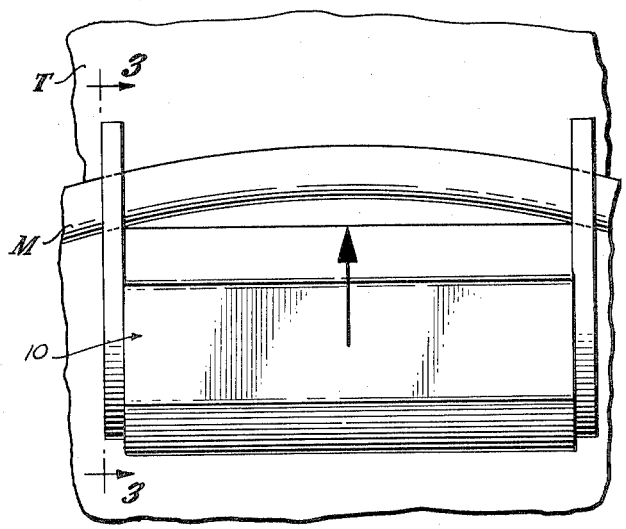
FIGURE 2 is a plan view of the test weight position in use on a vehicle rim mounting the usual tire.

In FIGURE 2 the test weight 10 is positioned upon a conventional rim M, upon which is mounted a conventional tire T, which may be of the pneumatic type.

Figure 3:
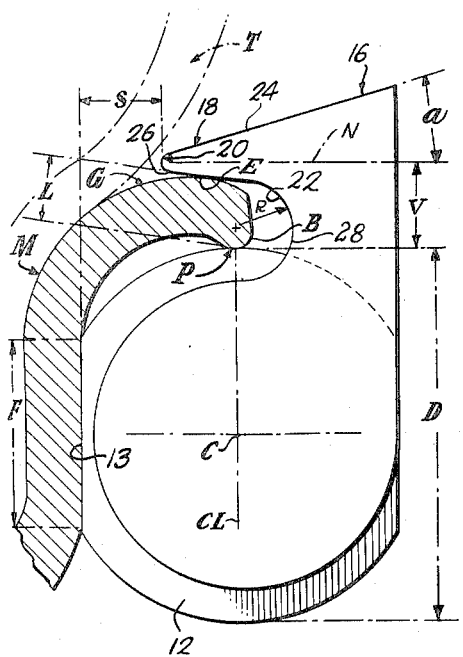
FIGURE 3 is a sectional view along lines 3—3 of FIGURE 2, showing the unique dimensions and size relationships of the test weight.
Figure 4:
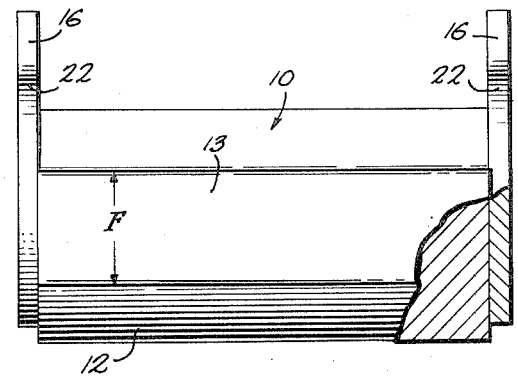
FIGURE 4 is a plan view partly in section of the test weight according to the present invention.

The rim M, as best shown in FIGURE 3, has a curved flange portion G and a lip portion B and the usual curvature.

The test weight 10 is particularly designed and adapted to present a concentrated mass as close to a single point as possible. Accordingly, it has been found that the test weights are preferably substantially round or oval, in which the dimension D, as shown in FIGURE 3, is between ½" and ⅞", with the optimum dimension being ¾". These dimensions are important in order to effect easy slidability of the weight on the rim and to achieve the weight compactness desired. Dimensions greater than ⅞" tend to raise the center of gravity of the test weight and also requires a too short length.

The body 12, which comprises the major portion of the weight 10, is made of a steel or other suitable material which weights in accordance with the length of the test weights which normally are about ½", 1½", and 2¼" long. Greater length is possible and is to be considered within the spirit of the invention; however, too long a length would be undesirable.

The body 12 has a flattened portion 13, which must be at least as wide as the flattened portion of the rim M. The extent of the flattened face is shown by the dimention F. The upper portion of the body 12 is shown to be flat; however, this is not an essential feature of the invention.

Secured to the body at the ends thereof are plates 14. These plates may of course be positioned anywhere within the body and are not necessarily nor essentially positioned at the extremities of the body. These plates comprise one of the unique feature of the present invention, in that they include a hook portion 16 which protrudes transversely to the longitudinal axis of the body. The hook portion includes an outer jaw portion 18 having an apex 20, which forms an opening 22, which is substantially U-shaped as viewed in FIGURE 3. The outer jaw 18 has an inner jaw 26 and an outer face 24 which meet to form the apex 20.

The approximate center of gravity and center of curvature C of the substantially cylindrical body 12, through which a center line CL passes, is shown also in FIGURE 3.

When the test weight 10 is positioned on the rim which mounts the tire, there are three points of possible contact between the weight and the rim: The first is at the flat face 13; the second is at point E, which is the point of tangent contact between the inner planar face 26 of the outer jaw portion 18 and curved portion of the rim M which is adjacent the tire; and the third is at the point P on the body at which the lip portion B contacts the body or comes close to the body.

It is to be noted that the point P must be below the center line CL and therefore below the center of curvature C of the body to prevent severe binding which would normally occur if this requirement were not followed when the weight is slid to its proper position along the rim during the balancing procedure. The center line as shown is parallel to the flat face 13.

An additional significant point is that the distance L in between the point E and the point P, shown as dimension FIGURE 3, should be greater by not more than $\frac{1}{16}''$ than the corresponding width in the same direction across the rim M. The purpose of such size is to maintain the center of gravity such that the test weight will not fall off the rim, and to provide the necessary slidability of the test weight around the rim. It should be noted that when the dimension L as measured on the weight is at its maximum—that is, $\frac{1}{16}''$ greater than the rim width in the same direction, the rim may not contact the weight at point P.

It is also important that the distance S between the bottom of the apex of the jaw and the flat face 13 be such that the apex does not contact the tire, and yet long enough to prevent the weight from falling off the rim. A dimension between .375" and .125" has been found desirable, with the dimension of .175" optimum.

The distance V, which is the distance from point P to the nearest point of possible tire contact measured from a line N normal to the apex 20 is variable depending upon the tire mounted on the rim; however, it has been found that this dimension should be approximately .375" to .150", with an optimum dimension of .175".

Furthermore, it has been discovered that the angle $a$ should be no greater than 45° and preferably is about 15° to 30°. This angle is measured from the normal line N to the forward or outer face 24 of the jaw portion 18.

The opening point 22 of the jaw is substantially U-shaped and has a round bottom 28 in which it has been found that the radius R should be about .100" plus or minus 0.05", with its center located about .015" plus or minus .005" above the center line CL and at a distance of .415" plus or minus 0.05" from the center C.

It has been found that these dimensions are effective in producing a testing weight which achieves all of the objectives as set forth in the present invention.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

We claim:
1. A slidable test weight for use only in balancing vehicle wheels having a tire and a rim which includes a face generally parallel to the plane of the tire mounted thereon and a lip portion extending outwardly from said face, said weight comprising an elongated substantially cylindrical body having a bottom flat face extending longitudinally of said body, said flat face having a width at least as wide as the width of the contiguous portion of said face of said rim, a pair of thin, flat plates secured to and extending longitudinally from said weight, said plates exposing said rim therebetween for substantially the length of said body, said plates having a hook portion opening in the direction of said face, said hook having an outer jaw spaced from said body, said jaw having an inner planar face which tangentially contacts said rim on the side adjacent said tire at a first point vertically between the flat face and a second point located at the point on the body closest to the lip portion of said rim, said second point being closer to the plane of the bottom flat face than the center line and center of curvature of said body is to said plane at said second point whereby said rim is not bound in said jaw, thereby to permit said weight to slide freely on said rim.

2. The test weight of claim 1, including the distance between the first point and the second point measured on said weight being not more than $\frac{1}{16}''$ greater than the corresponding dimension of said rim.

3. The test weight of claim 1, including said outer jaw having a leading edge remote from said body which is at an angle approximately not greater than 45° to a line normal to said flat face.

4. The test weight of claim 1, including said outer jaw having an apex adjacent said opening, said apex being approximately .375" to .125" above said flat face.

5. The test weight of claim 3, including said second point being between .375" to .150" from said normal line at said second point.

6. The test weight of claim 1, including said opening having a substantially V-shape having a radius between .050" and .150" and a center positioned approximately .01" to .02" above said center line and approximately .365" to .465" from the center of said body.

7. The test weight of claim 1, including the distance between the first point and the second point measurement on said weight being not more than $\frac{1}{16}''$ greater than the corresponding dimension on said rim, said outer jaw having a leading edge remote from said body which is at an angle approximately not greater than 45° to a line normal to said flat face, said outer jaw having an apex being approximately .375" to .125" above said flat face, said second point being between .375" to .150" from said normal line at said second point and including said opening having a substantial V-shape having a radius between .050" and .150" and a center positioned approximately .01" to .02" above said center line and approximately .365" to .465" from the center of said body.

References Cited by the Examiner

UNITED STATES PATENTS

| 1,997,825 | 4/1935 | Hume | 301—5 |
| 2,049,703 | 8/1936 | Hume | 301—5 |

LOUIS R. PRINCE, *Primary Examiner.*

DAVID SCHONBERG, RICHARD QUEISSER,
*Examiners.*